United States Patent [19]

Halpaap et al.

[11] Patent Number: 5,510,444
[45] Date of Patent: Apr. 23, 1996

[54] POWDER COATING COMPOSITIONS AND THEIR USE FOR COATING HEAT-RESISTANT SUBSTRATES

[75] Inventors: Reinhard Halpaap, Odenthal; Hans-Ulrich Meier-Westhues, Leverkusen; Christian Wamprecht, Neuss; Manfred Bock, Leverkusen; Wolfgang Schultz, Krefeld; Lothar Kahl, Bergisch Gladbach, all of Germany

[73] Assignee: Bayer Aktiengesellschaft, Leverkusen, Germany

[21] Appl. No.: 390,393

[22] Filed: Feb. 16, 1995

[30] Foreign Application Priority Data

Feb. 25, 1994 [DE] Germany .................. 44 06 157.9

[51] Int. Cl.⁶ .................................................. C08G 18/80
[52] U.S. Cl. .......................... 528/45; 428/422.8; 525/452; 528/52; 528/80; 528/84; 528/85
[58] Field of Search .................................. 528/45, 52, 80, 528/84, 85; 428/422.8; 525/452

[56] References Cited

U.S. PATENT DOCUMENTS

| | | | |
|---|---|---|---|
| 4,093,674 | 6/1978 | Tsutsui et al. . | |
| 4,252,923 | 2/1981 | König et al. | 525/452 |
| 4,313,876 | 2/1982 | Gras et al. . | |
| 4,413,079 | 11/1983 | Disteldorf et al. | 524/169 |
| 4,463,154 | 7/1984 | Disteldorf et al. | 528/45 |
| 4,483,798 | 11/1984 | Disteldorf et al. . | |
| 4,748,242 | 5/1988 | Halpaap et al. . | |
| 4,851,531 | 7/1989 | Halpaap et al. . | |
| 4,900,800 | 2/1990 | Halpaap et al. | 528/66 |

FOREIGN PATENT DOCUMENTS 71812  2/1985  European Pat. Off. .

*Primary Examiner*—Nathan M. Nutter
*Assistant Examiner*—John M. Cooney, Jr.
*Attorney, Agent, or Firm*—Joseph C. Gil; Thomas W. Roy

[57] ABSTRACT

A powder coating composition for the production of non-yellowing, flexible coatings which contains a mixture of a polyisocyanate component which contains one or more lacquer polyisocyanates having free (unblocked) isocyanate groups bound to primary and/or secondary carbon atoms and a polyol component containing one or more polyhydroxyl compounds selected from polyhydroxy polyurethanes, polyhydroxy polyacrylates and polyhydroxy polyesters, wherein at least 50% of the hydroxyl groups are bound to secondary or tertiary carbon atoms; and its use for coating heat-resistant substrates, in particular as clear coating compositions for automobiles.

20 Claims, No Drawings

POWDER COATING COMPOSITIONS AND THEIR USE FOR COATING HEAT-RESISTANT SUBSTRATES

BACKGROUND OF THE INVENTION

1. Field of the Invention

The present invention relates to new powder coating compositions which are solid below 30° C. and liquid above 120° C. and contain A1) lacquer polyisocyanates having an NCO functionality of at least 2.1 and containing free isocyanate groups bound to primary or secondary (cydo)aliphatic carbon atoms, and A2) organic polyhydroxyl compounds, particularly polyhydroxy polyurethanes. The invention also relates to the use of these coating compositions for coating heat-resistant substrates, particularly as clear coating compositions for automobiles.

2. Description of the Prior Art

Combinations of organic polyhydroxyl compounds and blocked polyisocyanates which are solid at room temperature constitute valuable resins for thermally crosslinkable polyurethane powder lacquers (for example, see DE-OS 2,105,777, DE-OS 2,542,191, DE-OS 2,735,497, DE-OS 2,801,126, DE-OS 2,812,252, DE-OS 2,946,085, DE-OS 3,143,060, DE-OS 3,434,881, EP-A-0,009,694, EP-A-0,218,040, EP-A-0,286,799, EP-A-0,403,779, EP-A-0,409,745, EP-A-0,460,963, WO 91/15 532, U.S. Pat. No. 3,857,818 and U.S. Pat. No. 4,375,539). The systems disclosed in these references have the common disadvantage that during thermal crosslinking the compounds used as blocking agents are split off and escape into the environment. For environmental and industrial hygiene reasons, special precautions therefore have to be taken to purify the off-gas and/or to recover the blocking agent.

One attempt to eliminate this major disadvantage is manifested in the use of IPDI powder lacquer hardeners which contain linear uretdione and urethane groups and which are free from blocking agents. These hardeners contain free terminal isocyanate groups, urethane groups or urea groups (EP-A 0,045,994, EP-A-0,045,996 and EP-A-0,045,998), and crosslinking occurs with thermal cleavage of the uretdione groups. However, one disadvantage of these hardeners is that they are strictly linear due to their method of synthesis. This does not enable branching of the lacquer to occur, which is necessary to obtain good solvent-resistance, scratch-resistance and high hardness.

In some instances polyisocyanates having free isocyanate groups have been used as crosslinking agents for polyurethane powder lacquers. For example, EP-A-0,009,694 describes solid hardeners based on partially trimerized IPDI, which contain free isocyanate groups in addition to blocked isocyanate groups. However, in the embodiments described in this document the proportion of blocked isocyanate groups is always greater than the proportion of free isocyanate groups, so that there is no risk of premature crosslinking during storage or during homogeneous mixing with resins containing hydroxyl groups in an extruder at temperatures of about 100° C. to 120° C.

EP-0,023,626-B1 also describes polyisocyanates used as powder lacquer hardeners. These polyisocyanates contain free isocyanate groups in addition to isocyanates blocked with ε-caprolactam. These products are based on a thin film IPDI trimer which has a low monomer content and which only has a low content of free isocyanate groups and a low functionality ($\leq 1$), based on the free isocyanate groups. Premature crosslinking with the OH components in the extruder also does not occur with these products.

According to EP-A-0,045,994, polyuretdiones of IPDI which contain free terminal isocyanate groups are used as powder lacquer hardeners. However, the free NCO groups react completely with resins containing hydroxyl groups during homogenization in the extruder at 100° to 130° C. (EP-A-0,045,994, page 20, line 13).

The formulation of powder lacquers which are stable during storage and which exclusively contain free isocyanate groups and hydroxyl groups for crosslinking is not possible according to these prior publications.

The use of unblocked polyisocyanates as powder lacquer hardeners has also been proposed in EP-A-0,071,812. However, according to the teachings of this reference crosslinking occurs via an NCO/epoxide reaction, from which the presence of free hydroxyl groups must be absolutely excluded, since crosslinking and gel formation would otherwise occur during the mixing and extrusion of the components. This reference also fails to describe powder coating compositions which are stable during storage and which contain free isocyanate groups in addition to hydroxyl groups.

EP-A-0,193,828, EP-A-0,224,165 and EP-A-0,254,152 describe special polyisocyanates which are solid at room temperature, contain isocyanurate and/or urethane groups, and which have isocyanate groups bound to tertiary (cyclo)aliphatic carbon atoms, as crosslinking components for polyurethane (PUR) powder lacquers. Due to the low reactivity of the tertiary NCO groups, these polyisocyanates can be mixed in unblocked form with powder resins containing OH groups at temperatures above their melting point, without an unwanted reaction occurring. When stoved at 150° to 220° C., preferably at 170° to 190° C., coating compositions formulated from these polyisocyanates produce highly crosslinked, glossy lacquer films with good hardness, flexibility and solvent-resistance.

DE-OS 2,359,538 describes powder coating compositions containing organic polyisocyanates and polyacrylate or polyester resins having free isocyanate groups and hydroxyl groups, which are produced by mixing the vehicle components in the melt. However the examples are exclusively directed to the use of linear diisocyanates and polyhydroxyl compounds with primary hydroxyl groups. This means that the resins of these powder coating compositions are not reactive mixtures which first react with crosslinking on the substrate, but instead are polyurethanes which have already reacted before they are applied and which are still thermoplastic due to the linearity of the diisocyanates. Crosslinking may be achieved by the simultaneous incorporation of epoxide groups, which may be crosslinked via dicarboxylic acids, as described in Example 1 of this reference.

In one attempt to further reduce solvent emissions from coating media, powder lacquers are currently being considered for a series of other applications, such as the primer coating of automobiles, which have previously been reserved for conventional solvent-containing or aqueous lacquer systems. In this respect there is a particular need for powder coating compositions which may be hardened below 160° C., preferably at about 140° C., without splitting off blocking agents and which result in highly crosslinked, solvent-free, flexible coatings.

The known PUR powder lacquers which contain hardeners without blocking agents described above cannot satisfy these requirements for a stoving temperature of about around 140° C. and for a high crosslink density. The prior art hardeners containing urethane groups and uretdione groups have a functionality which is too low to form highly crosslinked coatings. The hardeners having tertiary bound NCO groups can be converted to a highly branched form; however, their low reactivity does not satisfy the requirements for a low stoving temperature, just like the uretdione hardeners.

An object of the present invention is to provide new powder coating compositions which have a high reactivity and can be hardened, without splitting off blocking agents, to form highly crosslinked, solvent-resistant, flexible coatings.

This object may be achieved with the powder coating compositions described in detail below. The essential resins are a mixture of solid polyisocyanates having free isocyanate groups bound to primary and/or secondary carbon atoms and special polyol components having free OH groups.

The powder coating compositions described in detail below are based on the surprising observation that known branched solid polyisocyanates, which have NCO groups bound to primary and/or secondary carbon atoms, can be used as PUR powder lacquer hardeners, if the polyols used only contain OH groups bonded to secondary and/or tertiary carbon atoms. This fact was completely unexpected since, according to the existing prior art described above, the free primary and/or secondary NCO groups used in PUR lacquers normally react with free OH groups in the extruder during the production of the coating composition.

SUMMARY OF THE INVENTION

The present invention relates to a powder coating composition for the production of non-yellowing, flexible coatings which contains A) a resin mixture which is solid below 30° C. and liquid above 120° C., containing
  A1) a polyisocyanate component which has an NCO content of 5.0 to 23% by weight, an average NCO functionality of at least 2.1 and a content of monomeric diisocyanates having a molecular weight of less than 300 of less than 0.5% by weight and which contains one or more lacquer polyisocyanates having free (unblocked) isocyanate groups bound to primary and/or secondary carbon atoms and
  A2) a polyol component containing one or more polyhydroxyl compounds having an OH number of 30 to 200 and selected from polyhydroxy polyurethanes, polyhydroxy polyacrylates and polyhydroxy polyesters,
wherein at least 50% of the hydroxyl groups present in component A2) are bound to secondary or tertiary carbon atoms and wherein components A1) and A2) are present in amounts sufficient to provide an equivalent ratio of isocyanate groups to hydroxyl groups of 0.6:1 to 1.2:1, and optionally B) catalysts for the reaction between hydroxyl groups and isocyanate groups.

The present invention is directed to heat-resistant substrates coated with these coating compositions, particularly automobile substrates.

DETAILED DESCRIPTION OF THE INVENTION

The mixture of components A1) and A2) which is used according to the invention is prepared by mixing the individual components, optionally with heating for a short time in this respect the occurrence of a NCO/OH addition reaction cannot be completely ruled out. Therefore, in accordance with the present invention "resin mixtures" are understood to mean a mixture of components A1 ) and A2) in which reaction products of these components may also be present, provided that the total amount of these reaction products corresponds at most to the reaction of 30% of the NCO groups originally present in polyisocyanate component A1).

Polyisocyanate component A1) is selected from known lacquer polyisocyanates having a low monomer content and a content of free isocyanate groups bound to primary or secondary aliphatic or cycloaliphatic carbon atoms of 5 to 23% by weight, preferably 12 to 18% by weight, an average NCO functionality of at least 2.1, preferably at least 2.4 and most preferably at least 3.0, and a maximum content of monomeric diisocyanates having a molecular weight of less than 300 of 0.5% by weight, preferably a maximum of 0.3% by weight. Polyisocyanate component A1) preferably has a melting point or melting range between 30° C. and 120° C. However, this is not an essential condition, since what is important is that the mixture of components A1) and A2) is solid below 30° C. and liquid above 120° C. This condition may be fulfilled by combinations of liquid polyisocyanates and solid polyhydroxyl compounds.

Polyisocyanate A1) is preferably selected from known lacquer polyisocyanates which contain urethane groups and/or particularly isocyanurate groups. Suitable polyisocyanates containing isocyanurate groups may be prepared as described in EP-A-0,003,765, EP-A-0,010.589, EP-A-0, 017.998, EP-A-0,047,452. EP-A-0,187,105, EP-A-0.197, 864 and EP-A-0,330,966. Polyisocyanates modified with urethane groups may be obtained by reacting aliphatic diisocyanates with polyhydric aliphatic or cycloaliphatic alcohols having a molecular weight 62 to 1000 and optionally containing ether groups or ester groups, while maintaining an NCO/OH equivalent ratio of >2, preferably 3:1 to 15:1, most preferably 3:1 to 7:1, at temperatures of 60° to 120° C. The excess monomeric diisocyanate may be removed by distillation or extraction. The monomeric diisocyanate starting material is preferably separated by means of a thin film distillation apparatus at a temperature of 140° to 200° C. and a pressure of 0.1 to 0.5 mbar. The resulting polyisocyanates A 1) are present at 100% solids and have the required maximum monomer content of less than 0.5% by weight, preferably less than 0.3% by weight.

Lacquer polyisocyanates which contain both urethane and isocyanurate groups and which fulfil the above conditions are also suitable as component A1) according to the invention. Lacquer polyisocyanates which fulfil the above-mentioned conditions and which contain both allophanate and isocyanurate groups are also suitable. These polyiso-cyanates may be obtained according to German Patent Application P 43 35 796.2, for example.

Diisocyanate starting materials for the preparation of polyisocyanates A1) are selected from aliphatic diisocyanates having a molecular weight of 140 to 300.

1-Isocyanato-3,3,5-trimethyl-5-isocyanatomethyl cyclohexane (IPDI), 4,4'-diisocyanatodicyclohexyl methane (HMDI) and mixtures thereof with 1,6-diisocyanatohexane (HDI) are preferred. The diisocyanates used as starting materials for the preparation of lacquer polyisocyanates A1) are preferably mixtures, and most preferably contain 70 to 100% by weight of IPDI and/or HMDI and 0 to 30% by weight of HDI. Mixtures containing IPDI and/or HMDI homotrimers with HDI homotrimers are also suitable as component A 1).

The polyhydric alcohols which may optionally be used for urethane modification include ethylene glycol, 1,2- and 1,3-dihydroxypropane, 1,2-, 2,3- and 1,4-dihydroxybutane, 1,6-dihydroxyhexane, diethylene glycol, triethylene glycol, dipropylene glycol, neopentyl glycol, 2,2,4-trimethyl-1,3-dihydroxypentane, cyclohexane dimethanol, glycerine, trimethylolethane, trimethylolpropane, pentaerythritol and mixtures thereof. Polyhydric alcohols containing ester groups as described below under (a2) are also suitable but are less preferred.

The hydroxyl groups of polyol component A2) contain at least 50%, preferably at least 70%, and more preferably 90 to 100%, of hydroxyl groups which are bound to secondary and/or tertiary carbon atoms, with the remainder, i.e, up to a maximum of 50%, preferably up to a maximum of 30%, and more preferably up to a maximum of 10%, of alcoholic hydroxyl groups bound to primary carbon atoms. In addition, polyol component A2) has an OH number of 30 to 200 mg KOH/g, preferably 40 to 150 mg KOH/g, and a glass transition temperature $T_g$ determined by differential thermal analysis (DTA) of 30° to 120° C., preferably 40° to 100° C.

Suitable polyol components A2) include polyhydroxy polyurethanes A2a), which are preferably used, polyhydroxy polyacrylates A2b) or polyhydroxy polyesters A2c). Polyhydroxy polyurethanes A2a) may be obtained by the reaction of polyols (a), which are free from urethane groups with diisocyanates (b) while maintaining an OH/NCO equivalent ratio of 1.1:1 to 10:1, preferably 1.2:1 to 2:1, most preferably 1.3:1 to 1.8:1, at temperatures of 40° to 200° C., preferably 60° to 1600° C., provided that the equivalent ratio of primary OH groups in polyol starting materials (a) to the NCO groups of diisocyanates (b) ($OH_{prim}NCO$) is $\leq 1$.

Suitable polyols (a) for the synthesis of polyhydroxy polyurethanes A2a) include:
(a1) aliphatic or cycloaliphatic polyhydric alcohols having a molecular weight of 62 to 400, preferably 76 to 261, which may optionally contain ether groups,
(a2) polyhydroxyl compounds containing ester groups and having a number average molecular weight (which may be calculated from their functionality and OH number) of 134 to 2000, preferably 176 to 1500, and an average OH functionality of 2.0 to 4.0, and optionally, but less preferably
(a3) polyhydroxyl compounds containing ester groups and having a number average molecular weight (which may be calculated from their functionality and OH number) of greater than 2000 to 10,000, preferably greater than 2000 to 5000, and having OH numbers of 20 to 200, preferably 40 to 160.

Polyols (a1) are generally used for the incorporation of the secondary and/or tertiary OH groups. Suitable examples include 1,2-propanediol, 1,2-, 1,3- or 2,3-butanediol, 3-methyl-1,3-butanediol, 2,5-hexanediol, 2-methyl-2,4-pentanediol, 1,2-octanediol, 2-ethyl-1,3-hexanediol, 2,5-dimethyl-2,5-hexanediol, 2,2,4-trimethyl-1,3-pentanediol, 1,2-hexadecanediol, 1,12-octadecanediol, 1,2- or 1,4-cyclohexanediol, 2,2,4,4-tetramethyl-1,3-cyclobutanediol, 2,2-bis-(4-hydroxycyclohexyl)-propane, glycerine and 1,2,6-hexanetriol.

Polyols which exclusively contain primary OH groups may also be used as polyols (a1), but as a rule are used in lesser proportions. Polyols which are suitable for this purpose include 1,2-ethanediol, 1,3-propanediol, 1,4-butanediol, 1,6-hexanediol, diethylene glycol, triethylene glycol, dipropylene glycol, neopentyl glycol, cyclohexane dimethanol, 1,1,1-trimethylolethane, 1,1,1-trimethylolpropane, pentaerythritol and 1,3,5-tris-(2-hydroxyethyl)isocyanurate.

Polyhydroxyl compounds (a2) containing ester groups which are used for the preparation of polyhydroxy polyurethanes A2a) are selected from ester alcohols, which may be prepared, for example, by the reaction of polyhydric alcohols with sub-stoichiometric amounts of polyvalent carboxylic acids, the corresponding carboxylic acid anhydrides or the corresponding polycarboxylic acid esters of lower alcohols, or by the reaction of polyhydric alcohols with lactones.

Polyhydric alcohols which are suitable for the preparation of ester alcohols (a2) include those having a molecular weight range of 62 to 400 and listed under heading (a1). The preceding restrictions apply to the amounts of primary, secondary or tertiary OH groups such that the polyhydroxy polyurethanes A2a) have the required content of secondary and/or tertiary hydroxyl groups.

The acids or acid derivatives used for the preparation of the ester alcohols may be aliphatic, cycloaliphatic, aromatic and/or heteroaromatic, and may optionally be substituted, e.g. by halogen atoms, and/or unsaturated. Suitable acids include polyhydric carboxylic acids having a molecular weight of 118 to 300 or their derivatives, such as succinic acid, adipic acid, sebacic acid, phthalic acid, isophthalic add, trimellitic acid, phthalic arthydride, tetrahydrophthalic acid, maleic acid, maleic anhydride, dimeric and trimeric fatty acids, terephthalic acid dimethyl ester and terephthalic acid-bis-glycol ester.

Mixtures of these starting compounds may also be used for the preparation of the ester alcohols. Their preparation is described in Houben-Weyl, XIV/2, pages 1–46, for example.

Ester polyols prepared from lactones are also preferred starting components (a2) for the preparation of polyhydroxy polyurethanes A2a). Such ester polyols may be prepared in known manner from lactones and simple polyhydric alcohols as the starter molecules, with ring opening. A prerequisite for the use of such materials is that sufficient amounts of synthesis components with secondary and/or tertiary hydroxyl groups are also used to satisfy the previously described requirements.

Suitable lactones for the preparation of these ester polyols include β-propiolactone, γ-butyrolactone, γ- and δ-valerolactone, ε-caprolactone, 3,5,5- and 3,3,5-trimethyl caprolactone or mixtures thereof. Polyhydric alcohols (a1) may be employed as starter—molecules. The preferred ester polyols are generally prepared in the presence of catalysts, such as Lewis or Bronstedt acids, or organic tin or titanium compounds, for example, at temperatures of 20° to 200° C., preferably 50° to 160° C.

Polyhydroxyl compounds (a3) having a higher molecular weight and containing ester groups may optionally also be used for the preparation of polyhydroxy polyurethanes A2a). They are prepared as described under a2) from the same starting compounds.

Preferred components (a1) include 1,2-propanediol, 2-methyl-2,4-pentanediol, 2-ethyl-1,3-hexanediol and 2,2,4-trimethyl-1,3-pentanediol.

Preferred components (a2) are those based on 1,6-hexanediol, 1,1,1-trimethylolpropane and ε-caprolactone, isophthalic acid, phthalic anhydride, tetrahydrophthalic acid, maleic anhydride and adipic acid.

Components (a3) are only used, if at all, in lesser amounts, and are not preferred.

Suitable diisocyanates (b) for the synthesis of polyhydroxy polyurethanes A2a) include those which have a molecular weight range of 140 to 300 and contain isocyanate groups bound to (cyclo)aliphatic carbon atoms, such as 1,4-diisocyanatobutane, 1,6-diisocyanatohexane (HDI), 2-methyl-1,5-diisocyanatopentane, 2,2-dimethyl-1,5-diisocyanatopentane, 2,2,4- or 2,4,4-trimethyl-1,6-diisocyanato-hexane, 1,10-diisocyanato-decane, 1,3- and 1,4-diisocyana-tocyclohexane, 2- or 4-methyl-1,3-diisocyanatocyclo-hexane, 1,3- or 1,4-bis-(2-isocyanatoprop-2-yl)benzene, 1-isocyanato-3,3,5-trimethyl-5-isocyanatomethylcyclohex-ane (IPDI) and 4,4'-diisocyanatodicyclohexylmethane (HMDI). Preferred diisocyanates (b) are HDI, IPDI and HMDI, with the latter being particularly preferred.

Polyols (a) may be reacted with diisocyanates (b) to prepare the polyhydroxy polyurethanes A2a). Polyols (a) are generally used as mixtures selected from polyols (a1) and polyols (a2) containing ester groups, and optionally polyols (a3). The composition is selected so that the above-mentioned conditions regarding the OH/NCO ratio and the $OH_{prim}$/NCO ratio are satisfied.

Suitable mixtures of polyols (a) for the preparation of polyhydroxy polyurethanes A2a) may be obtained, e.g., by reacting polyhydric alcohols (a1) with less than stoichiometric amounts of ester alcohols (a2) to directly produce mixtures.

Starting materials (a) and (b) are selected such that they fall within the OH number range for polyol component A2) and such that polyhydroxy polyurethanes A2a) are formed as resins which are solid at room temperature and which have a glass transition temperature $T_g$ of 30° to 120° C., preferably 40° to 100° C.

Polyhydroxy polyurethanes A2a) may be prepared in a single-stage or in a multistage process. Thus the total amount of polyols (a) may be introduced and reacted with diisocyanates (b). However, diisocyanates (b) may also be reacted, for example, with a partial amount of polyols (a 1) under mild reaction conditions to form prepolymers containing secondary/tertiary OH and NCO groups, and the polyols (a2) containing primary OH groups may then be allowed to react, for example. In another embodiment, polyols (a1) and/or (a2) containing primary OH groups may also be reacted with excess diisocyanate (b) to form prepolymers with NCO terminal groups, after which the secondary and/or tertiary OH groups are introduced by reaction with polyols (a1) and/or optionally (a2).

The reaction temperature required for urethane formation is 20° to 200° C., preferably 40° to 160° C. and more preferably 40° to 120° C. The reaction is preferably conducted in the absence of solvent. Known catalysts may be used to speed up the urethane-forming reaction. Examples include tertiary amines such as triethylamine, pyridine, methyl pyridine, benzyl dimethylamine, N,N-endoethylene-piperazine, N-methyl piperidine, pentamethyl diethylene triamine, N,N-dimethylaminocyclohexane and N,N-dimethyl piperazine; or metal salts such as iron(11) chloride, zinc chloride, zinc 2-ethylcaproate, tin(11) 2-ethylcaproate, dibutyltin(IV) dilaurate and molybdenum glycolate. These catalysts are used in amounts of 0.001 to 2.0% by weight, preferably 0.01 to 0.2% by weight, based on the weight of the starting compounds.

Although the preparation of polyhydroxy polyurethanes A2a) is preferably carried out in the melt in the absence of solvent, inert solvents may be used in some cases. In these cases a suitable evaporation procedure is used to free the resulting compounds A2a) from solvent and to isolate the solid resins. Suitable evaporation procedures are those described below for the preparation of suitable polyhydroxy polyacrylates A2b).

Suitable polyacrylate polyols A2b) should satisfy the requirements regarding the bonding of hydroxyl groups to secondary and/or tertiary carbon atoms, the QH number and the glass transition temperature previously set forth for component A2). Such polyacrylate polyols A2b) may be obtained by several methods.

1. The use of hydroxypropyl (meth)acrylate (a mixture of isomers having about 75% of secondary- and about 25% of primary-bound OH groups formed on the addition of propylene oxide to (meth)acrylic acid) as the hydroxy-functional comonomer in the preparation of polyacrylates A2b).

As a rule, three types of monomers are used for the preparation of these polyacrylates:

(i) 6.95 to 51.45 parts by weight of hydroxypropyl (meth-)acrylate (ii) 43.55 to 93.05 parts by weight of non-functional olefinically unsaturated compounds, and (iii) 0 to 5 parts by weight of carboxy-functional olefinically unsaturated compounds, wherein the sum of the parts by weight of components (i) to (iii) is 100.

Monomers (ii) are selected from aromatic compounds, such as styrene, vinyltoluene, oc-methylstyrene and oc-ethylstyrene; (cyclo)alkyl esters of acrylic or methacrylic acid having 2 to 18 carbon atoms in the (cyclo)alkyl radical, such as methyl (meth)acrylate, ethyl (meth)acrylate, n-propyl (meth)acrylate, isopropyl (meth)acrylate, n-butyl (meth-)acrylate, isobutyl (meth)acrylate, tert.-butyl (meth)acrylate, 2-ethylhexyl (meth)acrylate, cyclohexyl (meth)acrylate, neopentyl (meth)acrylate, isobornyl methacrylate, benzyl methacrylate, phenylethyl methacrylate, 3,3,5-trimethylcyclohexyl methacrylate and stearyl methacrylate; and dialkyl esters of maleic and/or fumaric acid having 1 to 12 carbon atoms in the alkyl radical, such as maleic acid dimethyl ester, maleic acid diethyl ester, maleic acid di-n-propyl ester, maleic acid diisopropyl ester, maleic acid di-n-butyl ester, maleic acid diisobutyl ester, maleic acid di-tert.-butyl ester, maleic acid di-2-ethylhexyl ester, maleic acid dicyclohexyl ester and the corresponding fumaric acid esters.

Monomers (iii) include acrylic acid, methacrylic acid, and half-esters of maleic or fumaric acids having 1 to 12 carbon atoms in the alcohol radical. Suitable alkyl radicals are those corresponding to those cited above for the dialkyl esters of maleic or fumaric acid of monomers (ii).

Within the above-mentioned limits of the quantitative portions for the preparation of the hydroxy-functional copolymers A2b), any mixtures of monomers (i) to (iii) may be used, provided that the monomers are selected such that the resulting copolymers A2b) have hydroxyl numbers and glass transition temperatures within the above-mentioned ranges. These requirements, which are essential in order that the copolymers may be used according to the invention, may be fulfilled if a suitable ratio of "softening" monomers, which result in a lowering of the glass transition temperature of the copolymers, to "hardening" monomers, which result in an increase in the glass transition temperature, is achieved during the preparation of the copolymers.

Examples of "softening" monomers include alkyl esters of acrylic acid, such as ethyl acrylate, n-butyl acrylate, isobutyl acrylate and 2-ethylhexyl acrylate. Examples of "hardening" monomers include alkyl esters of methacrylic acid, such as methyl methacrylate, ethyl methacrylate, isobutyl methacrylate, cyclohexyl methacrylate isopropyl methacrylate, tert.-butyl methacrylate, neopentyl methacrylate, isobornyl methacrylate and 3,3,5-trimethyl cyclohexyl methacrylate; and aromatic vinyl compounds, such as styrene, vinyltoluene and α-ethylstyrene.

The hydroxy-functional copolymers are prepared by the radical-initiated copolymerization of the above-mentioned monomers in suitable organic solvents. In this respect the monomers are copolymerized at temperatures of 60° to 180° C., preferably 80° to 160° C., in the presence of radical formers and optionally molecular weight regulators.

The solvents have a boiling point or boiling range at 1013 mbar of 50° to 150° C., preferably 75° to 130° C. Examples of suitable solvents for the preparation of the copolymers include aromatic compounds, such as toluene or xylene; esters such as methyl acetate, ethyl acetate, isopropyl acetate, n-propyl acetate, isobutyl acetate, n-butyl acetate or methyl-n-amyl acetate; ketones such as 2-propanone, 2-butanone, 2-pentanone, 3-pentanone, 3-methyl-2-butanone, 4-methyl-2-pentanone, 5-methyl-2-hexanone or 2-heptanone; and mixtures of these solvents.

The preparation of copolymers A2b) may be carded out continuously or batch-wise. The monomer mixture and the initiator are usually uniformly and continuously introduced in metered amounts into a polymerization reactor, and the corresponding amount of polymer is continuously removed at the same time. Copolymers which are almost chemically homogeneous may be prepared in this manner. Copolymers which are almost chemically homogeneous may also be prepared by allowing the reaction mixture to run at a constant rate into a stirred vessel without removing the polymer.

A portion of the monomers may also be introduced into solvents of the above-mentioned type, with the remaining monomers and auxiliary materials being added to this batch at the reaction temperature. Polymerization generally takes place at atmospheric pressure, but may also be effected at pressures up to 25 bar.

The initiators are added in amounts of 0.05 to 15% by weight, based on the total amount of monomers. Suitable initiators are known and include aliphatic azo compounds such as azodiisobutyronitrile, azo-bis-2-methylvaleronitrile, 1,1'-azo-bis-1-cyclohexanenitrile and 2,2'-azo-bis-isobutyric acid alkyl esters; symmetrical diacyl peroxides such as acetyl, propionyl or butyryl peroxide; benzoyl peroxides or lauryl peroxides substituted with bromo, nitro or methoxy groups; symmetrical peroxydicarbonates, e.g. diethyl, diisopropyl, dicyclohexyl and dibenzoylperoxydicarbonate; tert.-butylperoxy-2-ethyl hexanoate; tert.-butyl-perbenzoate; hydroperoxides such as tert.-butyl hydroperoxide or cumene hydroperoxide; and dialkyl peroxides such as dicumyl peroxide; tert.-butyl cumyl peroxide or di-tert.-butyl peroxide.

Known regulators may be used in the preparation to control the molecular weight of the copolymer. Examples include tert.-dodecylmercaptan, n-dodecyl mercaptan and diisopropyl xanthogen disulphide. The regulators may be added in amounts of 0.1 to 10% by weight, based on the total amount of monomers.

To isolate solvent-free polyacrylate solid resins A2b), the resulting solutions are subjected to a solvent removal procedure in which the solvent is removed as completely as possible. Solvent removal procedures such as these may include spray drying, degassing in special or commercially available evaporation extruders or spiral tube evaporators, or distillation under vacuum or high vacuum.

Hydroxy-functional polyacrylates A2b) may also alternatively be prepared in bulk in the absence of solvents, and may be discharged and produced as hot melts. In a procedure such as this a portion of the monomers, preferably maleic acid dialkyl ester, is added and the remaining monomers and the initiator are added jointly or separately to this batch at the reaction temperature, which is preferably 140° to 180° C. The final polymer is discharged as a melt from the reactor, cooled, and subsequently granulated.

2. Reaction of suitable carboxy-functional polyacrylates with monoepoxides, such as isobutylene oxide (2-methyl-1,2-epoxypropane), isoamylene oxide (2-methyl-2,3-epoxybutane), neohexene oxide (3,3-dimethyl-1,2-epoxybutane), cis- and/or trans-2,3-butylene oxide and cyclohexene oxide (1,2-epoxycyclohexane). The reaction of epoxides such as these with carboxy-functional polyacrylates is usually conducted at temperatures of 80° to 200° C. preferably 100° to 180° C., in the presence of catalysts. Due to the low boiling points of the epoxides, the reaction is advantageously conducted in pressurized reactors at pressures up to 20 bar.

Examples of suitable catalysts include salts of tertiary ammonium compounds, such as tetrabutylammonium chloride or tetrabutylammonium bromide.

The carboxy-functional polyacrylates are prepared in the same manner as the above-mentioned hydroxyl-functional polyacrylates, except that no OH-functional monomers are used. Acrylic acid or methacrylic acid are preferably used as the carboxy-functional monomers, but half-esters of maleic acid and fumaric acid may also be used. One embodiment for the preparation of carboxy-functional polyacrylates starts from polyacrylates containing cyclic anhydride groups which are prepared using maleic anhydride and which are reacted in a second reaction stage with monohydric alcohols having 1 to 17 carbon atoms, optionally in the presence of amine catalysts, to form the corresponding half-esters.

Suitable non-functional comonomers which are used in addition to carboxyl- and/or anhydride-functional comonomers include those previously described for the preparation of the hydroxy-functional polyacrylates.

3. Reaction of suitable epoxide-functional polyacrylates with monocarboxylic acids, such as acetic acid, propionic acid, butyric acid, isobutyric acid, valeric acid, isovaleric acid, ethyl methylacetic acid, trimethylacetic acid and 2-ethylhexanoic acid. Longer-chain carboxylic acids having up to 17 carbon atoms are also suitable. However, in this case the epoxy-functional polyacrylates to be reacted have to have high glass transition temperatures, so that after reaction with the monocarboxylic acids, hydroxy-functional polyacrylates A2b) are formed with glass transition temperatures which are in the required range of 30° to 120° C.

4. Reaction of suitable hydroxy-functional polyacrylates with diisocyanates and aliphatic and/or cycloaliphatic diols. Examples of suitable hydroxy-functional polyacrylates are those described above under 1., and in addition, those which also contain primary hydroxy groups instead of secondary hydroxyl groups. In this respect polyacrylates containing primary hydroxyl groups, which may be prepared by the use of hydroxyethyl (meth)acrylate as the OH monomer are preferred. Suitable comonomers have already been cited above under heading 1.

Suitable diisocyanates include the compounds cited under (b) for the preparation of polyhydroxy polyurethanes A2a). Suitable aliphatic and/or cydoaliphatic diols with secondary and/or tertiary OH groups include the compounds listed under (a1). The method of preparing polyacrylates A2b) according to 4. is the same as the method described for the preparation of the polyhydroxy polyurethanes A2a).

Suitable polyester polyols A2c) should satisfy the requirements regarding the bonding of hydroxyl groups to secondary and/or tertiary carbon atoms, the OH number and the glass transition temperature previously set forth for component A2). Their number average molecular weight (which may be calculated from the OH content and OH functionality) is generally 400 to 10,000, preferably 1000 to 5000.

Polyester polyols A2c) are less preferred, but may be obtained by several methods, i.e., 1) the esterification of the previously described acids or acid derivatives with excess amounts of diols and/or triols containing secondary and/or tertiary alcoholic hydroxyl groups set forth under (a1), or 2) the reaction of suitable carboxy-functional polyesters with monoepoxides. According to this latter method polyesters containing carboxyl groups, which are known for coating compositions, may be reacted, as described above for the preparation of polyacrylates: A2b), with suitable monoepoxides, examples of which have previously been set forth.

Catalysts B) which may optionally be used to speed up the hardening of the coating compositions include the compounds known from polyurethane chemistry which have previously been described for catalyzing the urethane-forming reaction in the method of preparing polyhydroxy polyurethanes A2). Preferred catalysts are the zinc, tin(II) or tin(IV) salts previously described. Other suitable catalysts, as well as details concerning their method of operation are described in the Kunststoff-Handbuch [Plastics Handbook], Volume VII, edited by Vieweg and Höchtlen, Carl-Hanser-Verlag, Munich 1966, on pages 96 to 102.

These catalysts may optionally be added in amounts of 0.01 to 5.0% by weight, preferably 0.05 to 1.0% by weight, based on the solids content of polyisocyanate A1) and polyol A2), but excluding additives C).

Examples of additives C) which may optionally be used include levelling agents, such as polybutyl acrylate or those based on polysilicones; light stabilizers, such as sterically hindered amines; UV absorbers, such as benzotriazole or benzophenone; and pigments, such as titanium dioxide.

For the preparation of the ready-for-use powder coating composition, lacquer polyisocyanate component A1), polyhydroxyl component A2) and optional catalysts B) and additives C) are mixed together and blended to form a homogeneous material, e.g., in extruders or kneaders, at temperatures above the melting range of the individual components, e.g., at 80° to 140° C., preferably 80° to 1200° C. The solid which results after cooling the melt is then milled and freed from particle size fractions greater than 0.1 mm by sieving. Components A1) and A2) are used in quantitative proportions such that 0.6 to 1.2, preferably 0.8 to 1.0, isocyanate groups of component A1) are available for each hydroxyl group of component A2).

The production of the ready-for-use powder lacquers from the starting materials merely necessitates heating for a short time at temperatures above the melting range of the individual components. It may be assumed that a maximum of only 30% of the NCO groups of component A1) which were originally present react with part of component A2) with the formation of reaction products A3). This may be determined from the titrated NCO content and also by the fact that the melting range of the ready-for-use powder lacquer corresponds as a first approximation to the melting ranges of the individual components, particularly to the melting range of polyhydroxyl component A2), which is generally present in higher amounts by weight in the coating compositions. Only a short preliminary test is required in order to determine the optimum temperature for producing the ready-for-use coating compositions. This temperature is one at which it is possible to achieve intimate mixing of the individual components without undue amounts of reaction between the components taking place.

The resulting coating compositions produced in this manner may generally be stored at room temperature for an extended period, e.g. three to six months, without significant changes. However, cold storage, e.g., at a maximum of 10° C., is recommended in some cases depending on the composition.

The coating composition may be applied to the substrate to be coated by known powder application methods, such as electrostatic powder spraying or whirl sintering. Hardening of the coatings is carried out by heating to temperatures of 100° to 200° C., preferably 120° to 180° C., for a period of about 10 to 30 minutes. Hard, glossy, flexible coatings are obtained, which have outstanding corrosion protection properties and very good thermal color stability. The coating compositions have good light-fastness and weathering resistance and, thus, are particularly suited for outdoor applications. Any heat-resistant substrates, such as glass or metal substrates, may be coated according to the invention.

After mixing and melting the individual components in the extruder, the coating compositions according to the invention may also be applied directly in the molten state, using a special application procedure, to the substrate which has previously been coated and heated to a temperature above the melting point of the resin, and subsequently stoved.

The following examples serve to explain the invention further. With the exception of the gloss values, all pads and percentages are in weight percent unless otherwise indicated.

EXAMPLES

Preparation of Starting Compounds

Polyisocyanate I

Isophorone diisocyanate (IPDI) was trimerized according to Example 2 of EP-A-0,003,765 (U.S. Pat. No. 4,288,586) until an NCO content of 31.1% was obtained and then excess IPDI was removed by thin film distillation at 170° C./0.1 mbar. The resulting isocyanurate-polyisocyanate, which was suitable for use according to the invention as component A1 ), was an almost colorless solid resin having an NCO content of 16.4%, a melting point of about 100° C., and a content of monomeric IPDI of <0.2%.

Polyisocyanate II 1,6-diisocyanatohexane (HDI) was trimerized according to Example 12 of EP-A-0,330,966 until an NCO content of 38.1% was obtained and then excess HDI was removed by thin film distillation at 140° C./0.1 mbar. 16 parts by weight of this isocyanurate-polyisocyanate were homogeneously mixed with 84 parts by weight of polyisocyanate 1 in the melt at 120° C. The resulting isocyanurate-polyisocyanate, which was suitable for use according to the invention as component A1 ), was an almost colorless solid resin having an NCO content of 17.2%, a melting point of about 70° C., and a content of monomeric diisocyanates of <0.2%.

Polyisocyanate III 2620 g of 4,4'-diisocyanatodicyclohexylmethane were mixed with 10 g of a 10% solution of N,N,N-trimethyl-N-(2-hydroxypropyl)ammonium hydroxide (prepared by the reaction of trimethylamine with propylene oxide in methanol), dissolved in 2-ethyl-1,3-hexanediol:1,3-butanediol (4:1 ratio), and trimerized at 75° to 80° C. until an NCO content of 26.8% was obtained. In admixture with 15 pads by weight of the isocyanurate-polyisocyanate based on HDI described in Polyisocyanate II, 100 parts by weight of a yellowish solid resin were obtained after thin film distillation at 200° C./0.15 mbar. The resulting isocyanurate-polyisocyanate, which was suitable for use according to the invention as component A1), had an NCO content of 15.1%, a melting point of about 100° C., and a content of monomeric diisocyanates <0.2%.

Ester Polyol I—Preparation of a Component a2)

590 g of 1,1,1-trimethylolpropane (TMP) and 1505 g of ε-caprolactone were mixed at room temperature under dry nitrogen, added to 0.02 ortho-phosphoric acid and then heated at 160° C. for five hours. After cooling to room temperature a colorless, liquid product was obtained having the following characteristic properties:

| η (23° C.): | 1400 mPas |
|---|---|
| OH number: | 341 mg KOH/g |
| free caprolactone: | 0.4% |
| average molecular weight (calculated from OH number): | 493 |
| content of ester groups (calculated): | 27.7% |
| OH functionality: | 3 |

Ester Polyol II —Preparation of a Component a2)

A highly viscous, liquid polyester having the following characteristic properties was obtained from 334 parts isophthalic acid, 118 parts adipic acid, 60 parts phthalic anhydride, 380 parts 1,6-hexanediol and 108 parts 1,1,1-trimethylolpropane (TMP) at a temperature of 220° C. with the separation of water:

| OH number: | 142 mg KOH/g |
|---|---|
| average molecular weight (calculated from OH number): | 1185 |
| OH functionality: | about 3 |

Example 1—Preparation of a Polyhydroxy Polyurethane A2a)

A mixture of 246.0 parts of ester polyol I, 280.0 parts of ester polyol II and 182.4 parts of 1,2-propanediol was reacted with 655.0 parts of 4,4'-diisocyanatodicyclohexyl methane at 110° to 140° C., until all the NCO groups were consumed, The hot melt was poured onto a metal sheet and allowed to cool. A yellowish solid resin was obtained having the following characteristic properties:

| melting point: | about 80° C. |
|---|---|
| OH content: | 2.5% |
| equivalent weight: | 682 g/equiv OH |
| OH functionality: | 3.2 |

Example 2—Preparation of a Polyhydroxy Polyurethane A2a)

655.0 parts of 4,4'diisocyanatodicyclohexylmethane were mixed with 182.4 parts of 1,2-propanediol at 60° C. and allowed to react for about five hours at this temperature until an NCO content of 12.8% was obtained (theoretical NCO= 13.0%, based on the reaction of primary OH groups with NCO groups). A mixture of 246.0 parts of ester polyol I and 280.0 parts of ester polyol II was then introduced at 60 0° C. and the mixture was gradually heated to 120° C. over about two hours. Stirring was carried out at 120° C. until all the NCO groups were consumed. The hot melt was poured onto a metal sheet. After cooling, a yellowish solid resin was obtained having the following characteristic properties:

| melting point: | about 77° C. |
|---|---|
| OH content: | 2.5% |
| equivalent weight: | 682 g/equiv OH |
| OH functionality: | 3.2 |

Example 3—Preparation of a Polyhydroxy Polyurethane A2a)

655.0 parts of 4,4'-diisocyanatodicyclohexylmethane were added dropwise at 120° C. to a homogeneous mixture of 246.5 parts of ester polyol I, 360.0 pads of ester polyol II and 271.4 parts of 2-methyl-2,4-pentanediol. The mixture was allowed to react for about three hours at 120° to 150° C. until the NCO groups had completely reacted. After pouring out and cooling the melt on a metal sheet a solid resin was obtained with the following characteristic properties:

| melting point: | about 95° C. |
|---|---|
| OH content: | 2.2% |
| equivalent weight: | 762 g/equiv OH |
| OH functionality: | 3.3 |

Example 4—Preparation of a Polyhydroxy Polyurethane A2a)

655.0 parts of 4,4'-diisocyanatodicyclohexylmethane were added to 271.4 parts of 2-methyl-2,4-pentanediol at 80° C. The mixture was heated to 120° C. and allowed to react for about four hours until an NCO content of 12.5% was obtained (theoretical NCO=12.2%, based on the reaction of secondary OH groups with NCO groups). The batch was allowed to cool until an internal temperature of 60° C. was reached, then a mixture of 246.5 parts of ester polyol 1 and 360.0 parts of ester polyol II was added. The reaction was allowed to proceed for about 2.5 hours with gradual heating to 120° C. until the NCO groups had reacted. The viscous melt was poured onto a metal sheet, and a solid resin was obtained having the following characteristic properties:

| melting point: | about 85° C. |
|---|---|
| OH content: | 2.2% |
| equivalent weight: | 760 g/equiv OH |
| OH functionality: | 3.3 |

Example 5—Preparation of a Polyhydroxy Polyurethane A2a)

655.0 parts of 4,4'-diisocyanatodicyclohexylmethane were added dropwise at 120° C. over a period of about one hour to a homogeneous mixture of 280.0 parts of ester polyol II, 67.0 parts of 1,1,1-trimethylolpropane (TMP) and 283.2 parts of 2-methyl-2,4-pentanediol. Because the viscosity of the melt increased continuously, the melt was heated to 140° to 150° C. in order to be able to stir the mixture well. Stirring was then carried out for about one hour at this temperature until all the NCO groups had reacted. The hot melt was poured onto a metal sheet. After solidification a light yellowish solid resin was obtained having the following characteristic properties:

| melting point: | about 100° C. |
|---|---|
| OH content: | 2.6% |
| equivalent weight: | 645 g/equiv OH |
| OH functionality: | 3.2 |

Example 6—Preparation of a Polyhydroxy Polyurethane A2a)

655.0 parts of 4,4'-diisocyanatodicyclohexylmethane were added dropwise over a period of about 30 minutes at 120° C., with stirring from the outset, to a homogeneous mixture of 245.0 parts of ester polyol I, 280.0 parts of ester polyol II and 250.0 parts of 2-methyl-1,3-butanediol. The reaction was allowed to proceed for about three hours at 120° to 130° C. until all the NCO groups had reacted. The melt was poured onto a metal sheet. After cooling, a solid resin was obtained having the following characteristic properties:

| melting point: | about 75° C. |
| OH content: | 2.4% |
| equivalent weight: | 710 g/equiv OH |
| OH functionality: | 3.2 |

Example 7—Preparation of a Polyhydroxy Polyurethane A2a)

555.0 parts of 1-isocyanato-3,3,5-isocyanatomethyl cyclohexane (IPDI) were added at 120° C. over about 30 minutes to a mixture of 600.0 parts of ester polyol II, 67.0 parts of 1,1,1-trimethylolpropane (TMP), 146.0 parts of 2,2,4-trimethyl-1,3-pentanediol and 118.0 parts of 2-methyl-2,4-pentanediol. The mixture was allowed to react for about two hours at 120° to 125° C. until all the NCO groups had reacted. The hot melt was poured onto a metal sheet. After cooling, a solid resin was obtained having the following characteristic properties:

| melting point: | about 90° C. |
| OH content: | 2.3% |
| equivalent weight: | 743 g/equiv OH |
| OH functionality: | 4.0 |

Example 8—Preparation of a Polyhydroxy Polyacrylate A2b)

700 g of butyl acetate were introduced into a 5 liter pressurized polymerization reactor with automatic temperature control and heated to 125° C. The following reagents were then added through separate inlets: a monomer mixture containing 915 g of methyl methacrylate, 580 g of n-butyl methacrylate, 455 g of styrene and 260 g of acrylic acid was added over two hours, and an initiator solution containing 115 g of tert.-butylperoxy-2-ethyl hexanoate as a 70% solution in isododecane and 105 g of butyl acetate was added over 2.5 hours. The mixture was subsequently stirred for 1.5 hours at 125° C., followed by cooling to 90° C. and reducing the pressure to atmospheric pressure. Then 365 g of 3,3-dimethyl-1,2-epoxybutane and 5 g of tetrabutylammonium bromide were added, and the mixture was heated to 120° C. and stirred at this temperature until the acid number was <2 mg KOH/g. The solvent and other volatile components were then distilled off under vacuum, and the molten resin melt was poured into sheet aluminum basins and dried to constant weight in a vacuum drying oven at 140° C. under a vacuum of about 0.1 mbar. An almost colorless solid resin was obtained having a solids content of 99.3%, an acid number of 0.2 mg KOH/g and a hydroxyl number of 75.8 mg KOH/g.

Example 9—Preparation of a Polyhydroxy Polyacrylate A2b)

700 g of butyl acetate were introduced into a 5 liter pressurized polymerization reactor with automatic temperature control and heated to 125° C. The following reagents were then added through separate inlets: a monomer mixture containing 935 g of methyl methacrylate, 590 g of n-butyl methacrylate, 460 g of styrene and 270 g of acrylic acid was added over two hours, and an initiator solution containing 115 g of tert.-butylperoxy-2-ethyl hexanoate as a 70% solution in isododecane and 105 g of butyl acetate was added over 2.5 hours. The mixture was subsequently stirred for 1.5 hours at 125° C., followed by cooling to 90° C. and reducing the pressure to atmospheric pressure. Thereafter 320 g of 2-methyl-1,2-epoxypropane and 5 g of tetrabutylammonium bromide were added, and the mixture was heated to 140° C. and stirred at this temperature until the acid number was <5 mg KOH/g. The solvent and other volatile components were then distilled off under vacuum, and the molten resin melt was poured into sheet aluminum basins and dried to constant weight in a vacuum drying oven at 140° C. under a vacuum of about 0.1 mbar. An almost colorless solid resin was obtained having a solids content of 99.6%, an acid number of 4.2 mg KOH/g and a hydroxyl number of 72.3 mg KOH/g.

Comparative Example A —Preparation of a Polyhydroxy Polyurethane with Primary OH Groups 2624 parts of 4,4'-diisocyanatodicyclohexylmethane were added to a homogeneous mixture of 2400 parts of ester polyol II, 134 parts of 1,1,1-trimethylolpropane (TMP) and 1354 parts of cyclohexanedimethanol over about 3 hours at 1200° C. As the viscosity increased, the melt was heated to 180° to 190° C. After the reaction was complete, the melt was poured on to a metal sheet. After cooling, a light solid resin was obtained in lump form and had the following characteristic properties:

| melting point: | about 125° C. |
| OH content: | 2.1% |
| equivalent weight: | 815 g/equiv OH |
| OH functionality: | 3.2 |

Comparative Example B —Preparation of a Polyhydroxy Polyacrylate with Primary OH Groups 9000 parts of toluene were introduced into a 25 liter stainless steel pressurized reactor fitted with stirring, cooling and heating apparatus, and heated to 125° C. Two portions were then added in parallel. Portion I was added over a total period of four hours and podion II was added over a period of five hours. Portion I was a mixture containing 3660 parts of methyl methacrylate, 2374 pads of n-butyl methacrylate, 1868 pads of styrene, 1892 pads of 2-hydroxyethyl methacrylate and 100 parts of acrylic acid. Portion II contained 480 parts of a 70% solution of tert.-butylperoxy-2-ethyl hexanoate in isododecane and 668 parts of toluene. The mixture was then stirred for two hours at 125° C. The polymer solution obtained was completely freed from toluene in a commercially available evaporation extruder at a temperature of about 150° C. and a dwell time of about 2 minutes under a vacuum of about 200 mbar. The product was then cooled and granulated. The solid copolymer obtained had an OH number of 70 and an acid number of 7.4.

Comparative Example C —Preparation of a Polyhydroxy Polyester with Primary OH Groups A mixture containing 38.2 parts of neopentyl glycol, 5.3 parts of 1,6-hexanediol and 4.5 parts of 1,1,1-trimethylolpropane (TMP) was esterified with 66.6 parts of terephthalic acid with the removal of water. After the removal of water was complete, the molten polyester was poured onto a metal sheet. After cooling, a solid resin was obtained having a melting range of about 80° to 85° C. and an QH number of 50 mg KOH/g.

Examples 10 to 15 and Comparative Examples D to F (use)

Examples 10 to 15, which are directed to six clear coating compositions according to the invention, demonstrate the high gloss values (Gardner gloss value; angle of reflection 20°) of the resulting coatings after stoving at 140° to 160° C., and the good storage stability of the coating compositions at room temperature as assessed by means of gel times.

Lacquer coatings prepared from the coating compositions of comparative examples D to F exhibited significantly lower gloss values, and the coating compositions did not possess good storage stability following production or after storage.

Examples 10 to 15 (use)

Clear lacquers were prepared from the following components: (data in parts by weight)

|  | Example | | | | | |
|---|---|---|---|---|---|---|
| Components | 10 | 11 | 12 | 13 | 14 | 15 |
| Example 2 | 74.3 | — | 73.5 | — | 73.0 | — |
| Example 4 | — | 74.3 | — | 73.5 | — | 73.0 |
| Polyisocyanate II | — | — | — | — | 25.0 | 25.0 |
| Polyisocyanate I | 24.7 | 24.7 | 24.5 | 24.5 | — | — |
| Catalyst* | — | — | 1.0 | 1.0 | 1.0 | 1.0 |
| Additive** | 1.0 | 1.0 | 1.0 | 1.0 | 1.0 | 1.0 |

*Hostanox ZNCS, a commercially available catalyst based on a zinc salt, manufactured by Hoechst AG
**Perenol F30P, a commercially available levelling agent based on a butyl acrylate copolymer, manufactured by Henkel, Düsseldorf.

To prepare the coating compositions the components were extruded using a ZDSK 28 twin-shaft extruder (manufactured by Werner & Pfleiderer) at 200 rpm and a housing temperature of 100° C., an outlet temperature of 120° C. and a dwell time of about 70 seconds. The granulated material obtained was milled using an ACM 2 separator mill (manufactured by Hosokawa Mikropul) with a 90 μm screen.

The following gel times were determined for these coating compositions, both directly after their preparation and also after storage for three months at room temperature:

|  | Example | | | | | |
|---|---|---|---|---|---|---|
|  | 10 | 11 | 12 | 13 | 14 | 15 |
| Gel time when fresh (sec) | | | | | | |
| 160° C. | >600 | >600 | 189 | 322 | 176 | 301 |
| 180° C. | 400 | >600 | 81 | 144 | 73 | 126 |
| 200° C. | 181 | 439 | n.d. | n.d | n.d. | n.d. |
| Gel time after 3 month's storage at room temp. (sec) | | | | | | |
| 160° C. | n.d. | n.d. | 163 | 297 | 161 | 285 |
| 180° C. | n.d. | n.d. | 61 | 112 | 52 | 98 |

(measured according to DIN 55 990 Part 8, Section 5.1)
n.d. = not determined.

For Examples 12 and 13 the NCO content was also determined by titration after preparation and after 3 months' storage at room temperature, and compared with the calculated value (4.0%). This showed that no reaction had occurred between starting components A1) and A2) during the preparation of the coating composition of Example 13, while for the coating composition of Example 12 a secondary reaction occurred to form reaction products A3). Even after 3 months' storage, the major part of the free NCO groups was unchanged, so that the coating composition was perfectly processable even after this period of storage.

|  | Example 12 | Example 13 |
|---|---|---|
| Calculated NCO (%) | 4.0 | 4.0 |
| NCO by titration (fresh, %) | 3.9 | 4.0 |
| NCO by titration (3 months' storage at room temp., %) | 3.3 | 3.5 |

Degreased steel sheets were coated with the powders according to the invention from Examples 10 to 15 and were stoved in a gradient oven for 30 minutes at 140° C./150° C./160° C. The coating thicknesses were 60±5 μm. The results are set forth in the following table.

|  | Examples | | | | | |
|---|---|---|---|---|---|---|
|  | 10 | 11 | 12 | 13 | 14 | 15 |
| Erichsen cupping index*) | | | | | | |
| 30 min 140° C. | 0.4 | 0.1 | 8.3 | 0.1 | 9.0 | 0.1 |
| 30 min 150° C. | 2.4 | 0.5 | 8.6 | 0.5 | 9.0 | 2.1 |
| 30 min 160° C. | 9.0 | 4.5 | 8.6 | 9.0 | 9.0 | 9.0 |
| acetone test**) | | | | | | |
| 30 min 140° C. | <50 | <50 | 0 | 0 | 0 | 2 |
| 30 min 150° C. | 2 | <50 | 0 | 0–1 | 0 | 0–1 |
| 30 min 160° C. | 1–2 | 2 | 0 | 0 | 0 | 0 |
| 20° C. gloss***) | | | | | | |
| 30 min 140° C. | 92 | 87 | 84 | 92 | 80 | 86 |
| 30 min 150° C. | 88 | 87 | 80 | 86 | 81 | 85 |
| 30 min 160° C. | 89 | 90 | 80 | 90 | 83 | 85 |

*)Erichsen cupping index, DIN 53 156
**)Acetone resistance, 50 back and forth strokes with a saturated swab 0 = film intact; 1 = film surface softened; 2 = film swelled as far as substrate; <50 = film disintegrated after less than 50 strokes
***)Gardner gloss; angle of reflection 20°.

The tests showed that coating compositions, which were stable during storage at room temperature, were obtained with the polyhydroxy polyurethanes from Examples 2 and 4 in combination with polyisocyanate hardeners I and II. At stoving temperatures of 140° to 160° C., these coating

Comparative Examples D to F (use)

Clear coating compositions were prepared from components (amounts in parts by weight) set forth in the following table. The coating compositions were prepared analogously to those of Examples 10 to 15.

|  | Comparative Example | | |
|---|---|---|---|
| Component | D | E | F |
| Comparative Example C) | 80.5 | — | — |
| Comparative Example B) | — | 71.1 | — |
| Comparative Example A) | — | — | 74.3 |

-continued

|  | Comparative Example | | |
|---|---|---|---|
| Component | D | E | F |
| Polyisocyanate I | 18.5 | — | 24.7 |
| Polyisocyanate II | — | 27.9 | — |
| Additive* | 1.0 | 1.0 | 1.0 |

*Perenol F30P, a commercially available levelling agent based on a butyl acrylate copolymer, manufactured by Henkel, Düsseldorf. The gel times were determined as follows:

|  | Comparative Example | | |
|---|---|---|---|
|  | D | E | F |
| Gel time fresh (sec) | | | |
| 160° C. | immediate | immediate | 86 |
| 180° C. | n.d. | n.d. | 44 |
| 200° C. | n.d. | n.d. | immediate |
| Gel time after 3 months' storage room temp. (sec) | | | |
| 160° C. | immediate | immediate | immediate | n.d. = not determined

Degreased steel sheets were coated with the coating compositions from Comparative Examples D to F and stoved in a gradient oven for 30 minutes at 140° C./150° C./160° C. Coating thickness 60±5 μm.

|  | Comparative Examples | | |
|---|---|---|---|
|  | D | E | F |
| Erichsen cupping index | | | |
| 30 min 140° C. | n.d.* | n.d.* | 7.6 |
| 30 min 150° C. | n.d.* | n.d.* | 8.0 |
| 30 min 160° C. | n.d.* | n.d.* | 7.9 |
| Acetone resistance | | | |
| 30 min 140° C. | n.d.* | n.d.* | 0–1 |
| 30 min 150° C. | n.d.* | n.d.* | 0–1 |
| 30 min 160° C. | n.d.* | n.d.* | 0 |
| 20° gloss | | | |
| 30 min 140° C. | n.d.* | n.d.* | 18 |
| 30 min 150° C. | n.d.* | n.d.* | 16 |
| 30 min 160° C. | n.d.* | n.d.* | 17 | n.d. = not determined
*Testing of Comparative Examples D and E was not possible, since the coatings did not melt under the curing conditions.

The tests showed that, in contrast to Examples 10 to 15, the formulations from Comparative Examples D to F did not result in stable coating compositions. In addition, these comparative formulations partially reacted during the preparation process and either did not melt or produced dull, matt surfaces during the stoving process.

Examples 16 and 17

Clear coating compositions were prepared from the following components (amounts in parts by weight):

| Component | 16 | 17 |
|---|---|---|
| Example 8 | 71.9 | — |
| Example 9 | — | 71.9 |
| Polyisocyanate III | 26.1 | 26.1 |
| Catalyst* | 1.0 | 1.0 |

-continued

| Component | 16 | 17 |
|---|---|---|
| Additive** | 1.0 | 1.0 |

*Hostanox ZNCS, a commercially available catalyst based on a zinc salt, manufactured by Hoechst AG
**Perenol F30P, a commercially available levelling agent based on a butyl acrylate copolymer, manufactured by Henkel, Düsseldorf.

To prepare the coating compositions the components were extruded using a Buss-Co-Kneter [Buss-Co Kneader]PLK 46 extruder at 150 rpm, a housing temperature of 20° C./60° C., a shaft temperature of 15° C. and an outlet temperature of about 95° C. The granulated material obtained was milled using an ACM2 separator mill (manufactured by Hosokawa Mikropul) and sieved through a 20 μm screen.

The following gel times were determined for these coating compositions, both directly after their preparation and also after storage for three months at room temperature:

|  | 16 | 17 |
|---|---|---|
| Gel time fresh (sec) | | |
| 180° C. | 120 | 139 |
| Gel time after 3 months' storage room temp. (sec) | | |
| 180° C. | 101 | 119 |

Degreased steel sheets were coated with coating compositions from Examples 16 and 17 and stoved in a gradient oven for 30 minutes at 150° C./160° C./170° C. The coating thicknesses were 60±5 μm. Films with good surface properties were obtained as evident from the following test results:

|  | 16 | 17 |
|---|---|---|
| Ehrichsen cupping index | | |
| 30 min 150° C. | 0.3 | 0.3 |
| 30 min 160° C. | 4.6 | 1.0 |
| 30 min 170° C. | 4.6 | 4.1 |
| Acetone resistance | | |
| 30 min 150° C. | 1 | 0–1 |
| 30 min 160° C. | 0–1 | 0 |
| 30 min 170° C. | 0 | 0 |

Examples 18 to 23 and Comparative Examples G to I (use)

Examples 18 to 23 are directed to six pigmented powder coating compositions according to the invention, which possess good storage stability at room temperature as determined by their gel times. Coatings prepared from these compositions were acetone-resistant and glossy and had Erichsen cupping index values of up to 8.0 mm.

In contrast to Examples 18 to 23, Comparative Examples G to I illustrate the poor storage stability of the coating compositions as determined by their gel times.

Pigmented coating compositions were prepared from the following components (amounts in parts by weight):

|  | Examples | | | | | | Comparison Examples | | |
|---|---|---|---|---|---|---|---|---|---|
| Component | 18 | 19 | 20 | 21 | 22 | 23 | G | H | I |
| Example 1 | 47.6 | — | 48.0 | — | 63.0 | — | — | — | — |
| Example 3 | — | 47.6 | — | 48.0 | — | 63.0 | — | — | — |
| Comparative Example A | — | — | — | — | — | — | 47.6 | 48.0 | 63.0 |
| Polyisocyanate III | 16.4 | 16.4 | — | — | — | — | 16.4 | — | — |
| Polyisocyanate I | — | — | 16.0 | 16.0 | 21.0 | 21.0 | — | 16.0 | 21.0 |
| Additive* | 1.0 | 1.0 | 1.0 | 1.0 | 1.0 | 1.0 | 1.0 | 1.0 | 1.0 |
| TiO$_2$ pigment** | 35.0 | 35.0 | 35.0 | 35.0 | — | — | 35.0 | 35.0 | — |
| Carbon black*** | — | — | — | — | 1.5 | 1.5 | — | — | 1.5 |
| Additive**** | — | — | — | — | 13.5 | 13.5 | — | — | 13.5 |

*)Modaflow P III, a commercially available levelling agent based on a butyl acrylate copolymer, manufactured by Monsanto
**)Bayertitan R-UB-4, manufactured by Bayer AG
***)Ruβ [Carbon black] -FW-2, manufactured by Degussa, Frankfurt
****)Blanc fix micro, manufactured by Sachtleben, Duisburg.

To prepare the powder coating compositions, the components were extruded using a Buss-Co-Kneter PLK 46 extruder at 150 rpm, a housing temperature of 70° C./100° C., a shaft temperature of 70° C. and an outlet temperature of about 120° C. The granulated material obtained was milled using an ACM2 separator mill (manufactured by Hosokawa Mikropul) and sieved through a 90 μm screen.

The following gel times were determined for these coating compositions, both directly after their preparation and also after storage for three months at room temperature:

|  | Examples | | | | | | Comparison Examples | | |
|---|---|---|---|---|---|---|---|---|---|
| Component | 18 | 19 | 20 | 21 | 22 | 23 | G | H | I |
| Gel time fresh (sec) 180° C. | 286 | 449 | 354 | >600 | 559 | >600 | 41 | 72 | 121 |
| Gel time after 3 months' storage at room temp, (sec) 180° C. | 256 | 428 | 319 | >600 | 538 | >600 | imm.* | imm.* | 34 |

*imm. = immediate.

Degreased steel sheets were coated with the compositions from Examples 22 and 23 and stoved in a gradient oven for 30 minutes at 160° C./170° C./180° C. The coating thicknesses were 60±5 μm. The following test results were obtained:

|  | Examples | |
|---|---|---|
|  | 22 | 23 |
| Erichsen cupping index | | |
| 30 min 160° C. | 0.5 | 0.4 |
| 30 min 170° C. | 4.3 | 0.5 |
| 30 min 180° C. | 8.0 | 6.5 |
| Acetone resistance | | |
| 30 min 160° C. | <50 | <50 |
| 30 min 170° C. | 1–2 | <50 |
| 30 min 180° C. | 0–1 | 2 |
| 20° C. gloss | | |
| 30 min 160° C. | 76 | 81 |
| 30 min 170° C. | 79 | 76 |
| 30 min 180° C. | 74 | 75 |

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A powder coating composition for the production of non-yellowing, flexible coatings which comprises A) a resin mixture which is solid below 30° C. and liquid above 120° C., containing A1) a polyisocyanate component which has an NCO content of 5.0 to 23% by weight, an average NCO functionality of at least 2.1 and a content of monomeric diisocyanates having a molecular weight of less than 300 of less than 0.5% by weight and which contains one or more lacquer polyisocyanates having free isocyanate groups bound to primary and/or secondary carbon atoms and A2) a polyol component containing one or more polyhydroxyl compounds having an OH number of 30 to 200 and comprising a member selected from the group consisting of polyhydroxy polyurethanes, polyhydroxy polyacrylates and polyhydroxy polyesters, wherein at least 50% of the hydroxyl groups present in component A2) are bound to secondary or tertiary carbon atoms and wherein components A 1 ) and A2) are present in amounts sufficient to provide an equivalent ratio of isocyanate groups to hydroxyl groups of 0.6:1 to 1.2:1, and optionally B) catalysts for the reaction between hydroxyl groups and isocyanate groups.

2. The coating composition of claim 1 wherein polyisocyanate component A1) has an NCO content of 12 to 18% by weight and an average NCO functionality of at least 2.4, and consists essentially of one or more polyisocyanates containing isocyanurate groups.

3. The coating composition of claim 2 wherein said polyisocyanates containing isocyanurate groups are prepared by partially trimerizing a mixture consisting of 70 to 100% by weight of 1-isocyanato-3,3,5-trimethyl-5-isocyanato-methyl cyclohexane and/or 4,4'-diisocyanatodicyclohexyl methane and 0 to 30% by weight of hexamethylene diisocyanate, and subsequently removing unreacted diisocyanate starting material, or by mixing corresponding amounts of the corresponding homotrimers.

4. The coating composition of claim 1 wherein polyol component A2) contains at least 50% by weight of polyhydroxy polyurethanes having a glass transition temperature $T_g$ of 30° to 120° C. and wherein at least 70% of the hydroxyl groups present in component A2) are bound to secondary or tertiary carbon atoms.

5. The coating composition of claim 2 wherein polyol component A2) contains at least 50% by weight of polyhydroxy polyurethanes having a glass transition temperature $T_g$ of 30° to 120° C. and wherein at least 70% of the hydroxyl groups present in component A2) are bound to secondary or tertiary carbon atoms.

6. The coating composition of claim 3 wherein polyol component A2) contains at least 50% by weight of polyhydroxy polyurethanes having a glass transition temperature $T_g$ of 30° to 120° C. and wherein at least 70% of the hydroxyl groups present in component A2) are bound to secondary or tertiary carbon atoms.

7. The coating composition according to claim 4 wherein polyol component A2) consists of said polyhydroxy polyurethanes.

8. The coating composition according to claim 5 wherein polyol component A2) consists of said polyhydroxy polyurethanes.

9. The coating composition according to claim 6 wherein polyol component A2) consists of said polyhydroxy polyurethanes.

10. A heat-resistant substrate coated with the coating composition of claim 1.

11. A heat-resistant automotive substrate coated with the coating composition of claim 1.

12. A powder coating composition that can be hardened without splitting off blocking agents to form highly crosslinked, non-yellowing, flexible coatings which comprises A) a resin mixture which is solid below 30° C. and liquid above 120° C., containing A1) a polyisocyanate component which has an NCO content of 5.0 to 23% by weight, an average NCO functionality of at least 2.1 and a content of monomeric diisocyanates having a molecular weight of less than 300 of less than 0.5% by weight and which contains one or more lacquer polyisocyanates having free isocyanate groups bound to primary and/or secondary carbon atoms and A2) a polyol component containing one or more polyhydroxyl compounds having an OH number of 30 to 200 and comprising a member selected from the group consisting of polyhydroxy polyurethanes, polyhydroxy polyacrylates and polyhydroxy polyesters, wherein at least 50% of the hydroxyl groups present in component A2) are bound to secondary or tertiary carbon atoms and wherein components A1) and A2) are present in amounts sufficient to provide an equivalent ratio of isocyanate groups to hydroxyl groups of 0.6:1 to 1.2:1, and optionally B) catalysts for the reaction between hydroxyl groups and isocyanate groups.

13. The coating composition of claim 12 wherein polyisocyanate component A1) has an NCO content of 12 to 18% by weight and an average NCO functionality of at least 2.4, and consists essentially of one or more polyisocyanates containing isocyanurate groups.

14. The coating composition of claim 13 wherein said polyisocyanates containing isocyanurate groups are prepared by partially trimerizing a mixture consisting of 70 to 100% by weight of 1-isocyanato-3,3,5-trimethyl-5-isocyanatomethyl cyclohexane and/or 4:4'-diisocyanato-dicyclohexyl methane and 0 to 30% by weight of hexamethylene diisocyanate, and subsequently removing unreacted diisocyanate starting material, or by mixing corresponding amounts of the corresponding homotrimers.

15. The coating composition of claim 12 wherein polyol component A2) contains at least 50% by weight of polyhydroxy polyurethanes having a glass transition temperature $T_g$ of 30° to 120° C. and wherein at least 70% of the hydroxyl groups present in component A2) are bound to secondary or tertiary carbon atoms.

16. The coating composition of claim 13 wherein polyol component A2) contains at least 50% by weight of polyhydroxy polyurethanes having a glass transition temperature $T_g$ of 30° to 120° C. and wherein at least 70% of the hydroxyl groups present in component A2) are bound to secondary or tertiary carbon atoms.

17. The coating composition of claim 14 wherein polyol component A2) contains at least 50% by weight of polyhydroxy polyurethanes having a glass transition temperature $T_g$ of 30° to 120° C. and wherein at least 70% of the hydroxyl groups present in component A2) are bound to secondary or tertiary carbon atoms.

18. The coating composition according to claim 15 wherein polyol component A2) consists of said polyhydroxy polyurethanes.

19. The coating composition according to claim 16 wherein polyol component A2) consists of said polyhydroxy polyurethanes.

20. The coating composition according to claim 17 wherein polyol component A2) consists of said polyhydroxy polyurethanes.

* * * * *